Jan. 29, 1963   J. S. FREISMUTH   3,075,703
THERMOSTATIC VALVE
Filed Sept. 23, 1960
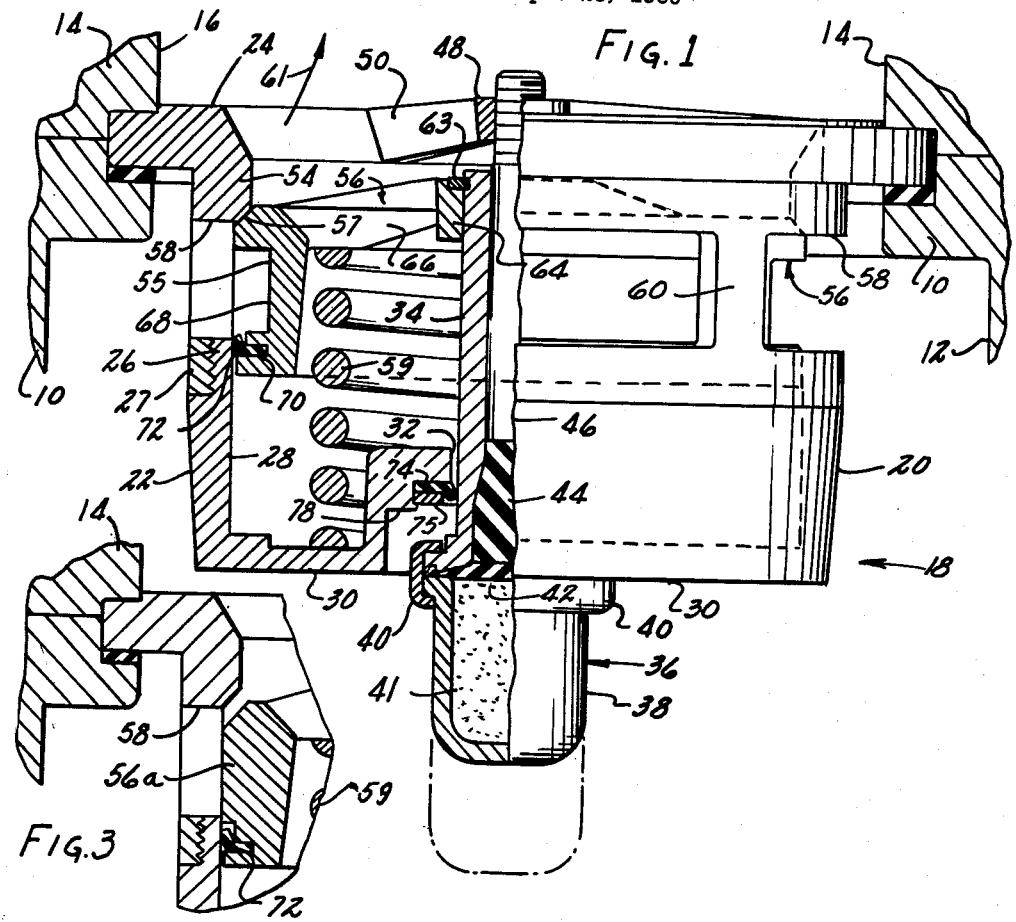
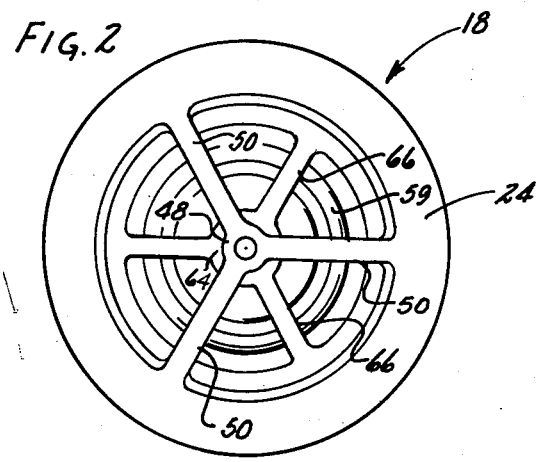
INVENTOR.
JOHN S. FREISMUTH
BY
WILSON, SETTLE, McRAE & CRAIG
ATTORNEYS 3,075,703
THERMOSTATIC VALVE
John S. Freismuth, St. Clair Shores, Mich., assignor to American Radiator & Standard Sanitary Corporation, New York, N.Y., a corporation of Delaware
Filed Sept. 23, 1960, Ser. No. 57,989
10 Claims. (Cl. 236—34)

This invention relates to a fluid line thermostatic valve, as for example a thermostatic valve adapted to be positioned in the cooling system of an automotive vehicle engine for controlling the flow of coolant to and from the engine jacket.

Thermostatic valves of the above-mentioned type are usually positioned directly in the coolant line in the space between the engine and vehicle radiator, the arrangement being such that when the coolant temperature falls below a specified value, as for example 160° F., the valve of the thermostat is closed so as to trap coolant in the engine jacket in a manner to cause the engine to raise the coolant temperature. The thermostatic valve is provided with a temperature-responsive power means which opens the thermostatic valve when coolant temperature rises appreciably above the specified value, the action being such that coolant is then passed to the radiator so as to be cooled thereby before it is returned to the engine. By the described arrangement the engine is maintained at a fairly even temperature, neither too hot nor tool cold for its most efficient operation.

One object of the present invention is to provide a thermostatic valve which can open and close with the application of a relatively small quantity of energy from the temperature-responsive power means, thereby making possible certain manufacturing economies in the power means and other thermostatic valve components.

Another object is to provide a thermostatic valve having an improved fluid flow valve therein.

A further object of the invention is to provide a thermostatic valve wherein certain of the components thereof can be manufactured as low cost, relatively high strength die castings.

An additional object is to provide a thermostatic valve having a relatively few number of component parts so as to reduce the number of assembling and fabricating steps necessary during manufacture.

Another object of the invention is to provide a thermostatic valve having a relatively long service life.

Other objects of this invention will appear in the following description and appended claims, reference being had to the accompanying drawings forming a part of this specification wherein like reference characters designate corresponding parts in the several views.

In the drawings:

FIG. 1 is an enlarged elevational view of one embodiment of the invention, with parts broken away for illustration purposes.

FIG. 2 is the top plan view of the FIG. 2 construction shown on a reduced scale.

FIG. 3 is a fragmentary sectional view of a second embodiment of the invention.

Before explaining the present invention in detail, it is to be understood that the invention is not limited in its application to the details of construction and arrangement of parts illustrated in the accompanying drawings, since the invention is capable of other embodiments and of being practised or carried out in various ways. Also, it it to be understood that the phraseology or terminology employed herein is for the purpose of description and not of limitations.

Referring to the drawings, and particularly FIGS. 1 and 2, there is shown at 10 a portion of an engine block which defines a passage 12 for the upward flow of coolant from the engine cooling jacket. Passage structure 14 extends above the engine block 10 and defines a coolant passage 16 which connects with tubing (not shown) leading to the vehicle radiator. It will be understood that after the coolant has passed through the radiator it is again pumped back to the engine, as by a conventional pump means (not shown).

The thermostatic valve mechanism for controlling the flow of coolant into and out of the engine is shown at 18, and comprises a generally cup-like housing 20 including the lower housing element 22 and the upper housing element 24. These housing elements are provided with the threaded sections at 26 and 27 for their fixed securement together. The purpose in forming the housing as two separate elements 22 and 24 is to enable the housing components to be formed as low cost, high strength, die castings.

Housing element 22 comprises a generally tubular side wall portion 28 and a closed end wall portion 30, said end wall portion having a central opening 32 therethrough for accommodating the sleeve portion 34 of the temperature-responsive power element 36. In the illustrated embodiment power element 36 is of conventional design, and comprises a small cup-like container portion 38 which is connected with the aforementioned sleeve portion 34 by an annular clamping ring 40. A charge of wax or other thermally expansible material 41 is contained within container 38 in the space below rubber diaphragm 42. The space above the diaphragm is occupied by a deformable rubber plug 44 which engages the lower end of a piston 46, the arrangement being such that thermal expansion of material 41 is effective on the diaphragm and plug to develop an upward thrust on the piston.

The upper end portion of piston 46 is threaded to permit it to be secured in a hub portion 48 which is formed as an integral part of the upper housing element 24. As best shown in FIG. 2, hub portion 48 is provided with the radially extended spokes 50 which connect with the peripheral portion of the upper housing element. The peripheral portion of the upper housing element is extended inwardly at 54 to define an annular seat 57 for the tubular flow-throttling portion 55 of a flow control device indicated generally by numeral 56. It will be seen that the flow-throttling portion 55 is located in radial alignment with a series of flow apertures 58 formed in the tubular side wall portion 60 of the upper housing element 24.

Thermostatic valve mechanism 18 is arranged so that coolant coming from the engine flows upwardly around the outside of housing 20, and thence into the flow apertures 58. In the FIG. 1 position flow of coolant past seat 57 is blocked by throttling portion 55. However, when the coolant temperature rises above a predetermined value the resultant expansion of material 41 causes sleeve portion 34 and container portion 38 to be moved downwardly on the piston 46. Sleeve portion 34 is connected with flow control device 56, as by means of a retainer ring 63, so that thermal expansion of material 41 is effective to move the flow throttling portion 55 downwardly away from seat 57 for thereby permitting the coolant to flow therepast as indicated by arrow 61. On fluid temperature decrease the resultant contraction of material 41 enables the compression spring 59 to return throttling portion 55 toward seat 57 to restrict the flow of fluid through apertures 58.

As shown in FIGS. 1 and 2, flow control device 56 comprises the above-mentioned tubular portion 55, a hub portion 64, and a series of spokes 66 extending therebetween. The flow control device is preferably formed as a low cost, high strength die casting, and the outer peripheral surface of the flow-throttling portion 55 may have a small annular groove 68 machined therein after the die casting operation. A second groove 70 may be machined in the die casting to form a mount for the annular flap-like rubber sealing element 72. An additional seal is provided by an annular flap-like sealing element 74 arranged above a washer 75. The washer may be operatively retained in place by means of conventional staking operations as at 78.

In the FIG. 1 embodiment the surface of the flow-throttling element 55 exposed to the flow apertures 58 is machined out as at 68. The groove formed by this construction apparently has some value as a fluid receiver, reducing fluid hammer or knock during the period when portion 55 is just nearing seat 57. It is noted however that advantageous results can be obtained without the machining operation at 68. Thus, as shown in FIG. 3 the outer surface of flow-throttling element 56a can conform to the contour of the inner surface of the housing sidewall while still obtaining an advantageous flow control action.

In both of the illustrated constructions it will be noted that flow-throttling element 55 is positioned entirely in the area downstream of the flow apertures 58. Thus, the flow-throttling element does not have to move against a substantial pressure differential during its travel toward and away from seat 57. Stated in another way, the spaces defined by spokes 66 serve to allow the fluid pressures existing above the flow-throttling element to be transmitted into the space immediately below the flow-throttling element so that the fluid pressure forces acting upwardly are substantially the same as those acting downwardly; by this arrangement there is thus achieved a balanced pressure condition on the flow-throttling element.

The balanced pressure condition is advantageous in that it enables the flow-throttling element to be moved upwardly with a relatively low strength, low cost power element 36. In this connection, economies can be achieved in the construction of the power element as regards the amount of material 41 to be charged, the thickness of the various power element walls, and the general power element size.

A further advantage of the illustrated construction is that the housing elements 22 and 24 and the flow control device 56 can each be formed as relatively low cost, high strength die castings. The arrangement is such as to economize on the number of fabricating and assembling steps which would otherwise be required.

An additional advantage of the illustrated arrangement is that no special mechanism is required for seating the ends of the compression spring 59. As shown in FIG. 1 the spring seats directly between two operating surfaces. The spring is located within flow control device 56 so that it is out of the general flow path taken by the coolant during its travel past seat 57, and thus the coil convolutions offer no resistance to the flow of coolant. This is in contrast to certain prior arrangements wherein the spring convolutions were located in positions directly in the fluid flow path.

The drawings necessarily show specific structural features utilized in specific forms of the invention, but it will be understood that variations therefrom may be resorted to without departing from the spirit of the invention as defined in the appended claims.

I claim:

1. A fluid line thermostatic valve comprising a tubular housing wall having a series of flow apertures arranged therearound; an end wall extending across the tubular wall on the upstream side so that fluid is caused to flow around the outside of the tubular wall and then through the flow apertures; wall means extending radially inwardly from a portion of the tubular housing wall adjacent the flow apertures to define a valve seat facing in the direction of the end wall; a flow control device including a tubular flow-throttling element movably telescoped within the tubular housing wall and having a valve face movable toward and away from the seat to control flow through the apertures; and temperature-responsive power means upstream of the end wall for moving the flow control device toward the seat on fluid temperature decrease and away from the seat on fluid temperature increase.

2. A fluid line thermostatic valve comprising a housing having an end wall, an opening in said end wall, a tubular side wall, a projection extending inwardly from the tubular side wall at the end thereof opposite the end wall to define a valve seat, a first hub portion, and spoke means interconnecting the tubular side wall and hub portion downstream of the valve seat; said tubular side wall having flow apertures arranged therearound to conduct fluid from the space outside the housing into the interior thereof; a flow control device comprising a tubular flow-throttling element movably arranged in the space between the end wall and valve seat to traverse the flow apertures, a second hub portion, and second spoke means extending between the flow-throttling element and second hub portion; and temperature-responsive power means for moving the flow-control device toward and away from the valve seat; said power means comprising a thermostatic power element for operating the flow-control device in one direction and spring means for operating the flow-control device in the opposite direction; said power element including a container portion positioned outside of the housing adjacent the end wall thereof, a charge of thermally expansible material within said container portion, a sleeve portion extending from the container portion slidably through said end wall opening and into the housing and connected with the second hub portion, and a piston slidably extending within the sleeve portion and connected with the first hub portion; said spring means comprising a compression spring trained between the housing end wall and second spoke means.

3. In a fluid line thermostatic valve, a tubular housing wall having a series of flow apertures arranged therearound, a valve seat formed on said tubular housing wall, an end wall extending across the tubular wall on the upstream side so that fluid is caused to flow around the outside of the tubular wall and then through the flow apertures, a flow control device including an imperforate, generally tubular, axially extending flow-throttling element movably telescoped within the tubular housing wall and adapted to traverse the flow apertures to control the flow of fluid therethrough, said flow-throttling element having a valve face adapted to mate with said valve seat, and temperature-responsive power means upstream of said cross wall for moving the flow control device to move said valve face away from said valve seat and open said flow apertures on fluid temperature increase and to close same on fluid temperature decrease.

4. A fluid line thermostatic valve as defined in claim 3, including sealing means between said generally tubular, axially extending flow-throttling element and said tubular housing wall to seal said flow apertures when said valve face is in contact with said valve seat.

5. In a thermostatic fluid flow control valve, a tubular wall, a transverse wall closing said tubular wall on the upstream side, a valve seat on the interior of said tubular wall and spaced from said transverse wall, a flow aperture in said tubular wall between said valve seat and said transverse wall, a valve element slidable within said tubular wall and positioned between said valve seat and said transverse wall and to close said flow aperture upon engaging said valve seat, means biasing said valve element toward said valve seat, and thermally responsive means positioned on the upstream side of said transverse wall and connected between said tubular wall and said valve element to move said valve element toward said transverse wall against the force of said biasing means and open said flow aperture.

6. A valve as defined in claim 5, including a seal between said valve element and said tubular wall and positioned between said flow aperture and said transverse wall.

7. In a thermostatic fluid flow control valve, a tubular wall, a transverse wall closing said tubular wall against axial fluid flow at the upstream end, a valve seat formed on the interior of said tubular wall and spaced from said transverse wall, a flow aperture in said tubular wall between said valve seat and said transverse wall, a circumferentially imperforate valve element slidable within said tubular wall and positioned between said valve seat and said transverse wall to close said flow aperture upon engagement against said valve seat, a circumferentialy extending groove on said valve element alignable with said flow aperture when said valve element is in closed relation against said valve seat, means biasing said valve element toward said valve seat, and thermally responsive means positioned on the upstream side of said transverse wall and connected between said tubular wall and said valve element to move said valve element toward said transverse wall against the force of said biasing means and open said flow aperture.

8. In a thermostatic fluid flow control valve, a tubular wall, a transverse wall closing said tubular wall on the upstream side, an aperture in said transverse wall, a valve seat on the interior of said tubular wall and spaced from said transverse wall, a flow aperture in said tubular wall between said valve seat and said transverse wall, a circumferentially imperforate endless hollow valve element slidable within said tubular wall and positioned between said seat and said transverse wall to close said flow aperture on engaging said valve seat, seal means between said tubular wall and said valve element and between said flow aperture and said transverse wall, and thermostatic means positioned on the upstream side of said transverse wall and operable in sliding sealed relationship through said aperture for moving said valve element relative to said seat.

9. In a balanced action thermostatic fluid flow control valve, a tubular wall, a transverse wall closing said tubular wall, an aperture in said transverse wall, a valve seat on the interior of said tubular wall and spaced from one side of said transverse wall, a flow aperture in said tubular wall between said valve seat and said transverse wall, a valve element slidable within said tubular wall between said seat and said transverse wall and adapted to close said aperture against fluid flow upon engaging said seat, seal means between said tubular wall and said valve element positioned between said flow aperture and said transverse wall, and thermostatic means on the other side of said transverse wall operable in slidable sealed relation through said aperture and adapted to move said valve element relative to said seat.

10. In a thermostatic fluid flow control valve, a tubular wall, a transverse wall closing said tubular wall and having a surface isolated from the interior of said tubular wall, a valve seat on the interior of said tubular wall and spaced from said transverse wall, a flow aperture in said tubular wall between said valve seat and said transverse wall, a valve element slidable within said tubular wall and positioned between said seat and said transverse wall to close said flow aperture on engagement with said seat, and thermally responsive means positioned adjacent said transverse wall isolated surface and operably connected to said valve element for moving said valve element relative to said seat.

References Cited in the file of this patent

UNITED STATES PATENTS

| | | |
|---|---|---|
| 1,696,410 | Palm | Dec. 25, 1928 |
| 2,498,194 | Arthur | Feb. 21, 1950 |
| 2,810,524 | Puster | Oct. 22, 1957 |
| 2,981,477 | Salmon | Apr. 25, 1961 |

FOREIGN PATENTS

| | | |
|---|---|---|
| 401,850 | France | Aug. 11, 1909 |